United States Patent Office 3,777,001
Patented Dec. 4, 1973

3,777,001
METHOD FOR THE PRODUCTION OF STRUCTURAL BODIES
Robert S. Clark, 1428 E. 3rd Place, Mesa, Ariz. 85203
No Drawing. Continuation-in-part of application Ser. No. 36,459, May 11, 1970. This application July 13, 1971, Ser. No. 162,268
Int. Cl. B29c 1/02
U.S. Cl. 264—337                      8 Claims

ABSTRACT OF THE DISCLOSURE

A method for producing structural bodies wherein unground but crushed clay pieces are introduced into a mold having a configuration related to the desired shape of the body to be produced. The mold in contact with the clay pieces is formed of solid graphite, which will not melt or otherwise deteriorate under the conditions prevailing during treatment and which will not adhere to or become embedded in the body being produced. The mold and clay particles present therein are heated to a temperature between about 1800° F. and 2500° F. Evidence indicates a solid reaction wherein the clay pieces have been densified, resulting in a product, which, when cooled, is a substantially homogenous, structurally sound body suitable for many load bearing applications including use as panels employed in the construction of homes and other buildings, and for large diameter clay pipe.

---

This application is a continuation-in-part of application Ser. No. 36,459 filed on May 11, 1970, and now abandoned.

This invention relates to an improved technique for the production of structural bodies. The invention will be particularly described with reference to the production of large diameter clay pipe, as well as load bearing bodies, such as panels, which may be employed in the building of walls, floors, or other portions of homes and other buildings. It will be appreciated when considering the following description that bodies of various configurations may be produced with the techniques of this invention whereby a variety of different applications for products of the invention are possible.

In the production of structural bodies, it is commmon practice to utilize readily available and relatively inexpensive clays as major constituents for the bodies. In view of the fact that clays available in different areas are always of somewhat different compositions, the properties of bodies produced with the clays are somewhat variable. Generally speaking, however, techniques have been developed which, through the addition of various other materials, and by varying processing conditions, enable the production of bricks, blocks and panels of a completely suitable nature.

The conventional techniques for producing structural bodies from clays involve grinding of the clays into relatively fine particles. These particles are then mixed with a binder, including moisture, which permits the clays to be molded into a desired shape. The molded bodies, in the "green" condition, are then dried and heated. The heating operation is usually carried out in a kiln at a suitably high temperature and for relatively prolonged periods. Significant additional time is required for cooling of the finished product.

It is a primary object of this invention to provide an improved technique for the production of structural bodies which makes the bodies available at extremely low cost without sacrificing the desired properties such as load bearing capabilities.

It is a more specific object of the invention to provide a technique for producing structural bodies which employs the relatively low cost materials commonly used in brick making and the like, but which eliminates the relatively costly and time-consuming operations which characterize prior techniques.

These and other objects of the invention will appear hereinafter and it will be understood that the specific examples set forth in this case are provided primarily for purposes of illustration and not for purposes of limting the scope of the invention.

The subject matter of this invention generally involves the provision of a mold suitable for forming structural bodies. Clay pieces of a desired type are incorporated into the mold, and the combination of the mold and the clay is then heated. The materials employed for forming the mold must be such that there will be no undesirable physical or chemical reactions between the charge and the mold material. Thus, the mold must be capable of withstanding the processing temperatures without deterioration. Furthermore, there can be no reaction which would result in embedding or adhering of mold material in the body being formed or which would result in the formation of a reaction product detrimental to the properties of the body formed.

The materials charged into the mold comprise as a main constituent clay, a suitable type having the clay mineral montmorillonite as its main ingredient. The clay is broken up into relatively coarse pieces before it is introduced into the mold, the clay pieces being unground but crushed to the extent that the large pieces do not exceed a diameter of about one to one and one-half inches. It is not necessary to apply pressure after the clay is introduced for purposes of compacting these pieces.

Once the clay pieces are located in a mold, the combination is heated immediately to firing temperatures. Typically, temperatures in the order of 2300° F. are employed with variations depending upon the specific type of clay used, and, to some extent, upon the desired properties of the product to be obtained. The actual temperature which is most suitable for a particular clay composition can best be determined by experimentation. In any event, it has been discovered that firing of the clay in a mold will result in bonding of the particles into an adherent mass of high structural strength whereby the product can be used as large diameter clay pipe, as load bearing panels, or in similar applications.

The method of this invention has been successfully carried out using graphite molds. Graphite has an extremely high degree of dimensional stability even when subjected to drastic changes in temperature. The material can be heated and cooled rapidly without changing shape and is resistant to thermal shock. Graphite has high thermal conductivity and, therefore, products may be heated rapidly in graphite molds and the products will cool evenly, with rapid heat dissipation when they are removed from the heated atmosphere. The properties of graphite can be changed, or existing desirable properties can be augmented by means of coatings, impregnations and plating processes. Theoretically, graphite can be impregnated with any material that can be liquefied.

The graphite has an additional advantage in that a thin film of fused clay covers the surface of structural bodies formed with this invention. The presence of the film provides a seal with respect to the internal body portions of the product. Furthermore the graphite provides a relatively attractive texture for the surface of the body being produced. In addition, a mold with this surface will provide a product having a clean surface which is easily freed from the mold.

A product with a textured surface may be provided by embedding crushed quartz, sand, small pebbles, or similar materials in the material by placing such materials on the bottom of the mold being used and then adding the charge.

In constructing a mold, graphite slabs, on the order of one-half inch to approximately two inches thick are used as mold walls. The assembly can then be placed in a kiln and a reducing atmosphere is preferably utilized during heating. In the case of pipe, outer and inner graphite pipes of suitable dimensions are used to provide the desired annular charging cavity.

The clay introduced into the mold is loosely crushed, and may be made up of pieces, the largest of which have a maximum dimension between about one-half inch and one- and one-half inches. It will be apparent that this charge material is totally different from the finely ground material conventionally employed.

When included in the mold, the charge material will be characterized by a density in the order of 50 to 90 pounds per cubic foot. During the heating operation, a significant amount of densification will occur. The density of the product after firing will exceed 90 pounds per cubic foot and may go as high as 125 pounds per cubic foot. Shrinkage in the order of 40 percent can commonly occur.

In order to allow for the shrinkage, the mold employed may be a trough-like construction having a bottom face and upstanding side walls. Accordingly, when the charge material is introduced into the mold, the material only engages the bottom and side walls with the top portion of the charge being exposed.

In the instance of large diameter clay pipe, an outer sleeve of graphite pipe is placed over a smaller diameter inner sleeve or pipe. The bell portion of the pipe, where this style is being made, will be formed at the bottom of the mold. The clay pieces are then introduced at the top and between the graphite parts. The upper end of the mold may be exposed to the atmosphere.

The fact that one surface of the product may be out of contact with a mold surface during the firing operation, also provides a means for obtaining structural panels having a unique surface which may be quite attractive in appearance. Thus, a glazed appearance may characterize this free surface, and this product face may be left undisturbed and exposed to view when located in a structure. The system of this invention is also useful for providing panels having unique appearances due to the presence of material other than the clay as aforementioned in the discussion of molds. For example, large pieces of quartz, or pieces of sand may be located over the bottom wall of a mold before the clay charge is introduced. The quartz or sand becomes embedded within the structural body produced in the course of the firing operation, and the surface of the resulting panel having the embedded quartz or sand may be exposed to view in a particular application of the invention.

The system of this invention is particularly adapted for the mass production of structural bodies on a highly efficient basis. For example, a shuttle kiln may be employed, designed to provide a reducing atmosphere. A plurality of mold carrying cars can then be driven through the kiln, each car carrying one or more molds filled with the charge material. The shuttle-kiln will be operated so that the charge material will be heated to the desired temperature level very rapidly, and will thereafter cool down toward room temperature. Since the system of this invention eliminates the previous requirements of grinding material into fine particles, the addition of a binder, and the formation of "greenware," the use of a shuttle-kiln will result in a fast output of structural panels or large diameter clay pipe, involving only the steps of forming clay into a desired relatively coarse size, charging the clay into molds, and proper operation of a kiln.

In the instance of large diameter clay pipe, a more efficient method involves the use of a high frequency electric induction furnace whereby the heat is generated directly into the graphite pipe. In this case, rapid heating may be accomplished, after which the high-frequency coils may be removed from the graphite (being lifted in the same way a car-bell kiln is lifted from the charge).

In this way the induction coils are readily available for the next charge. A ceramic fiber such as "Kaowool" produced by The Babcock & Wilcox Company, Refractories Division, Augusta, Ga., is used as a jacket surrounding the larger and outer graphite pipe. The fiber wrapping protects the electric induction coils from the heat which has been generated in the graphite. It also protects the graphite from oxidation after the induction coil has been removed. The wrapping provides this kind of protection and permits uninhibited electric induction from the surrounding coils to the graphite.

Various clays of the type commonly used for brick making and the like may be employed and clays having montmorillonite are particularly suitable. The following comprise examples of clay compositions suitable for use in the practice of this invention:

| Constituent: | Mesa clay | Porter's Creek clay | Brick shale, Mason City, Iowa |
|---|---|---|---|
| $SiO_2$ | 54.5 | 55.42 | 54.64 |
| $Al_2O^3$ | 15.0 | 15.61 | 14.62 |
| $Fe_2O^3$ |  | 3.55 | 5.69 |
| Fe | 3.0 |  |  |
| $CaCO^3$ | 9.6 |  |  |
| MgO | 2.67 | 1.46 | 2.90 |
| CaO |  | 0.94 | 5.16 |
| $Na_2O$ |  | Trace | 5.89 |
| $K_2O$ |  | 1.41 |  |
| $H_2O$ |  |  | 0.85 |
| $H_2O+$ |  | 14.28 | 3.74 |
| $CO_2$ |  |  | 4.80 |
| $TiO_2$ |  | 0.46 |  |
| Ti | 0.39 |  |  |
| $P_2O_5$ |  | 0.26 |  |
| Loss on ignition | 14.0 |  |  |

The Mesa clay set forth above has been found to have a plasticity index of 31, and, therefore, this would be considered an example of a plastic clay. It has been found, however, that clays with a plasticity index substantially lower than this also provide suitable constituent materials. Thus, most common brick clays as well as plastic clays are considered to be suitable for use in the production of bodies with the techniques of this invention. High fire refractory clays are not considered suitable because they would require a much higher temperature and are still more valuable in their present use in the refractories industry; however, application of the same principles on such clays is contemplated where applications outside the realm of the building industries are contemplated.

Structural bodies may be produced with the Mesa clay defined above by placing in a graphite mold. The clay particles preferably range in size from powder to particles having dimensions between one-half and one and one-half inches; the presence of a small amount of the smaller particles not affecting the results. The output of a hammer mill set to produce particles of the larger dimension provides a suitable charge. When the hammer mill is placed at the desired setting for the largest pieces to be included in the output of the mill, then a considerable amount of the output will be of smaller size including powder size.

The charged mold is heated to a temperature of 2300° F. within a very short time, for example within two to two and one-half hours. In other instances, experimentation has shown that after the elimination of free water and carbonates, the temperature rise may take place within minutes. This is possible because there is no pre-formed dimension in the clay charge (which would otherwise be caused to crack) and the graphite molds are highly resistant to thermal shock.

Cooling may commence immediately upon reaching the desired temperature, preferably on a gradual basis.

Simple placing of the charge is all that is required prior to firing. In one operation, a charge of Mesa clay had a density of 61.5 pounds per cubic foot after charging. The product removed from the mold after firing had increased in density to 103.8 pounds per cubic foot with a volume loss of approximately 48 percent.

It is believed that a solid reaction occurs during firing since the products of the system are extremely uniform throughout their cross sections, there being no basis for identifying the outlines of particles originally introduced. A somewhat vesicular, highly homogeneous mass is provided and the structural strength and density of the mass is extremely suitable for use in construction. The vesicular nature can generally be controlled by regulating the firing time with less vesicules resulting where the firing time is increased. Tests indicate that the Mesa clay treated as described above provides bodies having a compressive strength in excess of 10,000 pounds per square inch. The density is naturally increased as the prevalence of vesicles is reduced. It has been found that the best structural product is more vesicular and lighter in weight since this provides the best strength to density ratio, since a shorter firing time is more economical, and because such products are more easily handled.

The shape of the bodies produced can vary considerably depending upon the mold dimensions. A practical embodiment involves the production of panels suitable for use in forming load bearing walls in homes and other buildings. 4 by 8 panels, 6 inches thick, can be readily manufactured with the process of this invention. The fact that graphite molds are preferred is of particular value in this case since molds for manufacturing panels of these dimensions can be obtained at relatively low cost thereby adding additional economies. It has been found that a particularly practical embodiment involves the production of large diameter clay pipe on the order of 18 inches diameter and larger, using graphite pipe for molds.

It will be understood that various changes and modifications may be made in the above described method which provide the characteristics of this invention without departing from the spirit thereof.

That which is claimed is:

1. A method for producing structural bodies comprising the steps of providing a mold consisting essentially of graphite and having graphite walls of a thickness of at least about one-half inch thick, introducing clay pieces into said mold, said clay pieces being the type commonly used in brick making and the like and containing a major amount of $SiO_2$, and minor amounts of constituents in the group including $Al_2O_3$, $Fe_2O_3$, Fe, $CaCO_3$, MgO, CaO, $Na_2O$, $K_2O$, $H_2O$, $CO_2$, $TiO_2$, Ti, $P_2O_5$, and said pieces having a maximum dimension between one-half and one and one-half inches, heating said pieces while in said mold for a period up to about two and one-half hours to a temperature of about 2300° F. whereby the pieces are formed into an adherent mass forming a structural body, commencing cooling of said mold and the mass formed therein substantially immediately after reaching said temperature, and removing said mass from said mold.

2. A method in accordance with claim 1 wherein the density of the clay pieces in the mold prior to firing is between about 50 and 90 pounds per cubic foot.

3. A method in accordance with claim 1 including the step of locating a material selected from the group consisting of sand and quartz, over at least one surface of said mold, said material being located over said surface in particle form, and wherein said material is embedded in a surface of the structural body produced.

4. A method in accordance with claim 1 wherein said mold is formed by providing a first graphite slab forming a bottom wall and locating additional graphite slabs for form side walls, the top of the mold being exposed to the atmosphere.

5. A method in accordance with claim 4 wherein said clay pieces are heated in said mold under conditions protecting the graphite from oxidation.

6. A method in accordance with claim 1 wherein said mold is formed by providing a slab to form a bottom wall for the mold, locating a first graphite pipe on said slab, locating a second graphite pipe around said first graphite pipe, said pipes being positioned coaxially with said second pipe having an inner diameter exceeding the outer dimeter of said first pipe whereby an annular space is defined between said pipes, the body produced with said mold comprising a pipe structure having an inner and outer diameter substantially corresponding with the dimensions of said annular space.

7. A method in accordance with claim 6 wherein the top of said mold is exposed to the atmosphere, and wherein said clay pieces are heated in said mold under conditions protecting the graphite from oxidation.

8. A method in accordance with claim 1 wherein said clay pieces consist of clay selected from the group consisting of Mesa clay, Porter's Creek clay, and brick shale—Mason City, Iowa.

References Cited

UNITED STATES PATENTS

| | | | |
|---|---|---|---|
| 1,840,609 | 1/1932 | Slidell | 264—43 |
| 2,493,763 | 1/1950 | Klinefelter | 264—44 X |
| 2,128,404 | 8/1938 | Donbeck | 106—38.27 X |
| 2,180,757 | 11/1939 | Hermann | 264—67 X |

JOSEPH L. SCHOFER, Primary Examiner

D. A. JACKSON, Assistant Examiner

U.S. Cl. X.R.

249—134; 264—56, 65, 66